United States Patent
Dobashi et al.

(10) Patent No.: US 10,216,988 B2
(45) Date of Patent: Feb. 26, 2019

(54) INFORMATION PROCESSING DEVICE, INFORMATION PROCESSING METHOD, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventors: Toshimasa Dobashi, Kanagawa (JP); Hiroyuki Mizutani, Kanagawa (JP)

(73) Assignees: KABUSHIKI KAISHA TOSHIBA, Tokyo (JP); TOSHIBA SOLUTIONS CORPORATION, Kawasaki-Shi (JP)

( * ) Notice: Subject to any disclaimer, the term of this patent is extended or adjusted under 35 U.S.C. 154(b) by 160 days.

(21) Appl. No.: 14/865,316

(22) Filed: Sep. 25, 2015

(65) Prior Publication Data
US 2016/0092729 A1    Mar. 31, 2016

(30) Foreign Application Priority Data

Sep. 29, 2014   (JP) .................................. 2014-198825

(51) Int. Cl.
G06K 9/00         (2006.01)

(52) U.S. Cl.
CPC ..... G06K 9/00449 (2013.01); G06K 9/00442 (2013.01); G06K 9/00456 (2013.01); G06K 9/00469 (2013.01)

(58) Field of Classification Search
CPC ........... G06K 9/00442; G06K 9/00449; G06K 9/00456; G06K 9/00469
See application file for complete search history.

(56) References Cited

U.S. PATENT DOCUMENTS

| | | | |
|---|---|---|---|
| 5,799,115 A | 8/1998 | Asano et al. | |
| 6,421,693 B1* | 7/2002 | Nishiyama | G06F 17/243 715/225 |
| 7,020,320 B2* | 3/2006 | Filatov | G06K 9/723 382/137 |
| 7,110,600 B1* | 9/2006 | Matsui | G06K 9/2054 382/136 |
| 8,144,994 B2* | 3/2012 | Konishi | G06K 9/2054 382/209 |

(Continued)

FOREIGN PATENT DOCUMENTS

| | | |
|---|---|---|
| CN | 101622632 | 1/2010 |
| JP | 08-255236 | 10/1996 |

(Continued)

Primary Examiner — Utpal D Shah
(74) Attorney, Agent, or Firm — Amin, Turocy & Watson LLP

(57) ABSTRACT

According to an embodiment, an information processing device includes a storage unit, a reception unit, a recognition unit, and a specification unit. The storage unit stores therein accumulated information containing entry information of multiple types of forms accumulated by form type and entry field. The reception unit receives a form. The recognition unit recognizes the entry information contained in the form received by the reception unit. The specification unit compares the accumulated information and the entry information recognized by the recognition unit to specify the type of the form received by the reception unit.

5 Claims, 6 Drawing Sheets

(56) References Cited

U.S. PATENT DOCUMENTS

| | | | | |
|---|---|---|---|---|
| 8,238,614 B2* | 8/2012 | Konishi | G03G 15/5025 |
| | | | 382/112 |
| 8,676,731 B1* | 3/2014 | Sathyanarayana | |
| | | | G06K 9/00442 |
| | | | 706/12 |
| 8,885,951 B1* | 11/2014 | Cristofano | H04N 1/00795 |
| | | | 382/173 |
| 9,639,900 B2* | 5/2017 | Huang | G06K 9/00463 |
| 2002/0146170 A1* | 10/2002 | Rom | G06K 9/00469 |
| | | | 382/175 |
| 2006/0282442 A1* | 12/2006 | Lennon | G06F 17/30011 |
| 2008/0126335 A1* | 5/2008 | Gandhi | G06F 17/30622 |
| 2009/0116755 A1* | 5/2009 | Neogi | G06K 9/00442 |
| | | | 382/224 |
| 2010/0005096 A1 | 1/2010 | Minagawa et al. | |
| 2010/0135579 A1* | 6/2010 | Newcomer | G06K 9/00469 |
| | | | 382/190 |
| 2013/0287265 A1* | 10/2013 | Nepomniachtchi | |
| | | | G06K 9/00442 |
| | | | 382/115 |
| 2015/0324639 A1* | 11/2015 | Macciola | G06T 7/181 |
| | | | 382/112 |
| 2016/0342834 A1* | 11/2016 | Ragnet | G06K 9/00463 |

FOREIGN PATENT DOCUMENTS

| | | |
|---|---|---|
| JP | 2007-109051 | 4/2007 |
| JP | 2007-133593 | 5/2007 |
| JP | 2012-252657 | 12/2012 |

\* cited by examiner

FIG.2

| NAME | | SEX | |
|---|---|---|---|
| TARO YAMADA | | (MALE)/ FEMALE | |
| ADDRESS | | PRODUCT NAME | |
| ..., FUKUOKA | | SEDAN A | |
| UNIT PRICE | NUMBER | TOTAL AMOUNT | |
| 1000000 | 1 | 1000000 | |

FIG.3A

| NAME | SEX MALE / FEMALE |
|---|---|
| ADDRESS | PRODUCT NAME |
| UNIT PRICE | NUMBER | TOTAL AMOUNT |

FIG.3B

| NAME<br>[NAME FIELD] | SEX<br>(MALE)/(FEMALE) |
|---|---|
| ADDRESS<br>[ADDRESS FIELD] | PRODUCT NAME<br>[PRODUCT NAME FIELD] |
| UNIT PRICE<br>[PRICE FIELD] | NUMBER<br>[NUMBER FIELD] | TOTAL AMOUNT<br>[PRICE FIELD] |

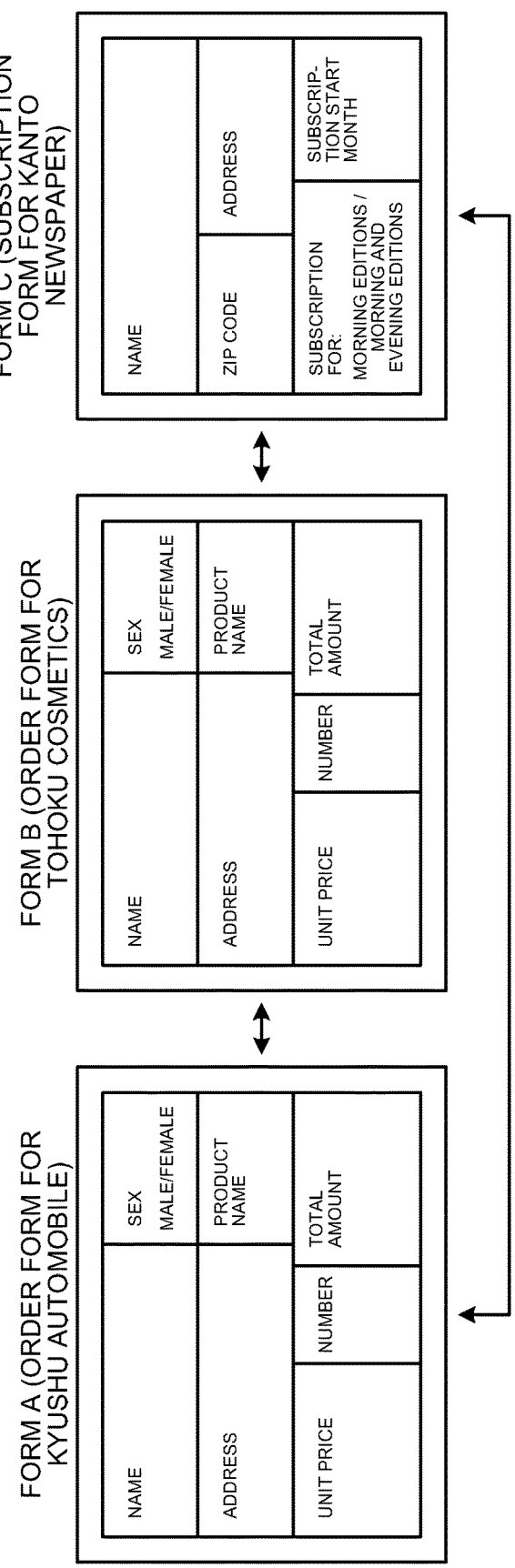

INFORMATION PROCESSING DEVICE, INFORMATION PROCESSING METHOD, AND COMPUTER PROGRAM PRODUCT

CROSS-REFERENCE TO RELATED APPLICATION

This application is based upon and claims the benefit of priority from Japanese Patent Application No. 2014-198825, filed on Sep. 29, 2014; the entire contents of which are incorporated herein by reference.

FIELD

Embodiments described herein relate generally to an information processing device, an information processing method, and a computer program product.

BACKGROUND

Technologies for automating work using forms by means of computers and the like have been known. One known example of such technologies is a form identification technology using pattern recognition of characters, figures and the like contained in forms. In many form identification systems using the form identification technology, blank forms indicating form formats such as positions of ruled lines forming the forms are stored and comparison of an input form with the blank forms is performed to identify the type of the input form.

BRIEF DESCRIPTION OF THE DRAWING

FIG. 2 is a diagram illustrating an example of a form;

FIG. 3A is a diagram illustrating an example of a blank form according to the embodiment;

FIG. 3B is a diagram illustrating an entry field format information according to the embodiment;

FIG. 4 is a diagram illustrating an example of a case in which the type of a form cannot be identified on the basis of format information;

DETAILED DESCRIPTION

In the related art, when the type of a form cannot be identified on the basis of the form format, a form type cannot be specified from multiple form types.

According to an embodiment, an information processing device includes a storage unit, a reception unit, a recognition unit, and a specification unit. The storage unit stores therein accumulated information containing entry information of multiple types of forms accumulated by form type and entry field. The reception unit receives a form. The recognition unit recognizes the entry information contained in the form received by the reception unit. The specification unit compares the accumulated information and the entry information recognized by the recognition unit to specify the type of the form received by the reception unit.

An embodiment of an information processing device, an information processing method, and a program will be described in detail below with reference to the accompanying drawings.

Figure 1:
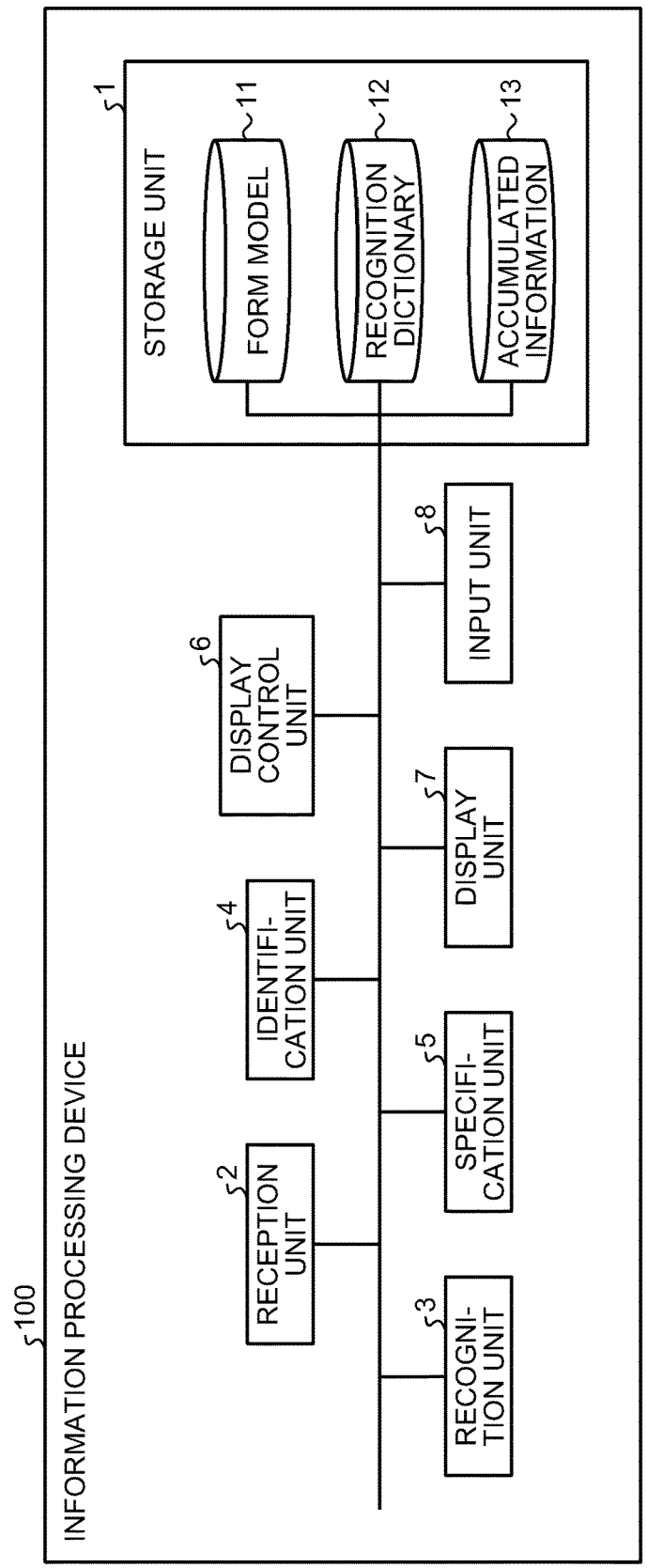
FIG. 1 is a diagram illustrating an example of a configuration of an information processing device according to an embodiment.

FIG. 1 is a diagram illustrating an example of a configuration of an information processing device 100 according to the embodiment. The information processing device 100 of the embodiment includes a storage unit 1, a reception unit 2, a recognition unit 3, an identification unit 4, a specification unit 5, a display control unit 6, a display unit 7, and an input unit 8.

The storage unit 1 stores information. The storage unit 1 stores a form model 11, a recognition dictionary 12, and accumulated information 13, for example. The form model 11, the recognition dictionary 12, and the accumulated information 13 will be described later.

The reception unit 2 receives a form. The reception unit 2 inputs the form to the recognition unit 3.

Note that the reception unit 2 may receive a form in any manner. The reception unit 2 receives an image representing a form, for example. The image may be an image file generated by reading of a form by a scanner or an image file generated by photographing of a form with a camera, for example.

FIG. 2 is a diagram illustrating an example of a form. FIG. 2 illustrates an example of a form used in work in an automobile dealer. "Sedan A" is written as a product name, for example. In the following, information written in a form will be referred to as entry information and regions where the entry information is written will be referred to as entry fields. For example, the entry fields in the form of FIG. 2 are fields of name, sex, address, product name, unit price, number, and total amount.

The description refers back to FIG. 1. The recognition unit 3 receives a form from the reception unit 2. The recognition unit 3 recognizes format information of the form and entry information contained in the form.

The entry information contains information indicating the content of entry (a character string, symbols, numbers, etc.) and information indicating the location of the entry content in the form.

The format information is information indicating the format of a form. The format information contains ruled line information indicating positions of ruled lines forming a form, preprinted character string information indicating the locations and the contents of preprinted character strings (explanation of entry fields, etc.), and entry field format information, for example. The entry field information will be described later with reference to FIG. 3B.

Specifically, the recognition unit 3 recognizes the format information and the entry information by using the recognition dictionary 12. The recognition dictionary 12 is a dictionary for recognizing patterns such as characters and figures and stores feature information obtained from a pattern in association with a character type of a figure pattern type corresponding thereto. The recognition unit 3 recognizes the format information and the entry information of a form from pattern recognition result information obtained as a result of a pattern recognition process by using the recognition dictionary 12.

The recognition unit 3 inputs the format information to the identification unit 4. The recognition unit 3 also inputs the entry information to the specification unit 5.

The identification unit 4 receives the format information from the recognition unit 3. The identification unit 4 compares the format information with the form model 11 to identify the type of the form. The identification unit 4 compares the format information with the form model 11 to determine whether or not the type of the form can be identified.

Here, the form model 11 will be described. The form model 11 stores blank forms and entry field format information by form type.

FIG. 3A is a diagram illustrating an example of a blank form As illustrated in FIG. 3A, a blank form is a form in which no entry information is entered. A blank form indicates the positions of ruled lines forming the form, and the locations and the contents of preprinted character strings (explanation of entry fields, etc.). In the example of FIG. 3A, the preprinted character strings (explanation of entry fields, etc.) are name, sex, male/female, address, product name, unit price, number, and total amount.

FIG. 3B illustrates an example of the entry field format information. The entry field format information indicates the input format of entry information entered in each entry field. In the example of the entry field format information in FIG. 3B, the input format of the name entry field indicates that a name is to be entered therein, for example. For another example, the input formats of entry information written in the unit price entry field and the total amount entry field indicate that the fields are price fields in which prices are to be entered. Note that the number field and the price fields may be associated with information such as the number of digits.

The description refers back to FIG. 1. Specifically, the identification unit 4 compares the ruled line information and the preprinted character string information contained in the format information with blank forms in the form model 11, and compares the entry field format information contained in the format information with the entry field format information in the form model 11.

If the type of a form can be identified, the identification unit 4 inputs information indicating one form type to the specification unit 5. If the type of a form cannot be identified, the identification unit 4 inputs information indicating multiple form types resulting from narrowing processing in the identification unit 4 to the specification unit 5.

Note that any method may be used for a specific identification process in the identification unit 4. For example, a method disclosed in JP-A No. 8-255236 (KOKAI) may be used.

Here, a case in which the identification unit 4 cannot identify the form type on the basis of the format information will be described.

FIG. 4 is a diagram illustrating an example of a case in which the form type cannot be identified on the basis of the format information. FIG. 4 illustrates examples of a form A (an order form for Kyushu Automobile), a form B (an order form for Tohoku Cosmetics), and a form C (a subscription form for Kanto Newspaper). It is possible to distinguish between the form A and the form C and between the form B and the form C on the basis of the format information, but the form A and the form B cannot be distinguished from each other on the basis of the format information. Thus, in a case where the form received by the reception unit 2 is the form A, comparison between the ruled line information and the preprinted character string information contained in the format information and the blank forms in the form model 11 conducted by the identification unit 4 indicates that the form A and the form B are identical, and thus the form type cannot be identified.

Even when the entry field format information is referred to, similarly, comparison between the entry field format information contained in the format information and the entry field format information in the form model 11 conducted by the identification unit 4 indicates that the form A and the form B are identical, and thus the form type cannot be identified.

The description refers back to FIG. 1. The specification unit 5 receives the entry information from the recognition unit 3 and receives the information indicating the form type from the identification unit 4. When the information indicating the form type received from the identification unit 4 contains multiple form types, the specification unit 5 compares the entry information with the accumulated information 13 for each form type to specify the form type.

Here, the accumulated information 13 will be described. The accumulated information 13 accumulates the entry information of multiple types of forms by form type and entry field. For example, the accumulated information 13 indicates multiple entry information data recognized in the past by the recognition unit 3 by form type and entry field. In this case, the entry information data recognized in the past are stored without any change or entry information data obtained by manual modification after being recognized are stored. The stored entry information data may be all of multiple entry information data recognized in the past and stored or may be entry information data stored during a certain period of time in the past.

Alternatively, the accumulated information 13 may store processed or aggregated entry information data. Thus, the storage format of the accumulated information 13 may be any format. For example, in the case of an entry field corresponding to the product name field in the form illustrated in FIG. 2, the accumulated information 13 may be simply stored as a history of entries in chronological order such as Sedan A, Sedan B, Truck C, Wagon A, Sedan B, . . . . Alternatively, for example, the accumulated information 13 may be stored in combination of a name and the number of occurrences of the name such as Sedan A: 100, Sedan B: 50, Sedan C: 70, . . . .

The accumulated information 13 also stores category information indicating a category of entry information in association with the entry information. A category is information classified according to the content of entry of the entry information. For example, when the content of entry is Sedan A, the category is automobile. For another example, when the content of entry is a lipstick A, the category is cosmetics.

When the information indicating the form type received from the identification unit 4 contains multiple form types, the specification unit 5, specifically, calculates reliabilities P of the form types according to a predetermined expression, and sequences the form types in descending order of the reliabilities P. Here, the predetermined expression for calculating a reliability P will be described. The specification unit 5 calculates the reliability P according to the following expression (1), for example:

$$P = w1 \times A + w2 \times B + w3 \times C \tag{1}$$

In the expression (1), w1, w2, and w3 are constants indicating predetermined weights. In addition, A is a variable indicating whether or not entry information is contained in the accumulated information 13. For example, A=1 if entry information is contained in the accumulated information 13, while A=0 if entry information is not contained in the accumulated information 13. In addition, B is a variable indicating the proportion (%) of entry information contained in the accumulated information. For example, B is a value from 0 to 1. In addition, C is a variable indicating the proportion of (%) entry information in the same category as the entry information contained in the accumulated information. For example, C is a value from 0 to 1.

The result of calculation according to the expression (1) will be described more specifically. Herein, a case in which the field of product name (product name field) in the form A (Kyushu Automobile) and the form B (Tohoku Cosmetics) in FIG. 4 is used for calculation of the reliability P will be described. For simplicity, w1=w2=w3=1 is assumed. A case in which the content of entry of entry information is Sedan A will be described specifically. Assume that Sedan A is contained in the product name field in the form A in the accumulated information 13, that the proportion of Sedan A is 50%, and that the proportion of entry information included in automobile that is the same category as Sedan A is 80%. Also assume that Sedan A is contained in the product name field in the form B in the accumulated information 13, that the proportion of Sedan A is 1%, and that the proportion of entry information included in automobile that is the same category as Sedan A is 2%.

In this case, the reliability P when the form type is the form A is: P=1+0.5+0.8=2.3. The reliability P when the form type is the form B is: P=1+0.01+0.02=1.03. As a result, when the reception unit 2 has received the form A, the specification unit 5 can specify that a form with higher reliability P is the form A even when the identification unit 4 cannot identify the form type on the basis of the format information.

Note that the entry field used for calculation of the reliability P by the specification unit 5 may be determined in any manner for each form. Furthermore, the specification unit 5 may specify a form on the basis of the reliabilities P of multiple entry fields. Furthermore, the predetermined expression used for calculation of the reliability P by the specification unit 5 may be any expression. The specification unit 5 may use a predetermined expression using a character occurrence frequency, a word occurrence frequency, a character type, a number, an attribute (name and address, etc.), region and a bias (tendency) in region, sex, etc. of an entry field.

When the information indicating the form type received from the identification unit 4 contains one form type, the specification unit 5 stores the entry information of the form type as accumulated information 13 for each entry field on the basis of the information indicating the form type and the entry information received from the recognition unit 3.

When the information indicating the form type received from the identification unit 4 contains multiple form types, the specification unit 5 inputs order information indicating the order of the form types determined on the basis of the reliabilities P to the display control unit 6. Upon receiving the information indicating one form type selected by the user from the display control unit 6, the specification unit 5 stores the entry information of the form type as the accumulated information 13 for each entry field on the basis of the information indicating the form type and the entry information received from the recognition unit 3.

The display control unit 6 controls information to be displayed on the display unit 7. Upon receiving order information from the specification unit 5, for example, the display control unit 6 displays multiple form types in descending order of the reliabilities P on the basis of the order information and displays a selection screen for receiving selection of a form from the user on the display unit 7. The display control unit 6 inputs information indicating the form type received from the user via the selection screen to the specification unit 5.

The display unit 7 displays information. The display unit 7 displays the selection screen described above, for example.

The input unit 8 receives input from the user. The input unit 8 receives an input indicating selection of a form type, for example.

Next, an information processing method for the information processing device 100 according to the embodiment will be described.

Figure 5:
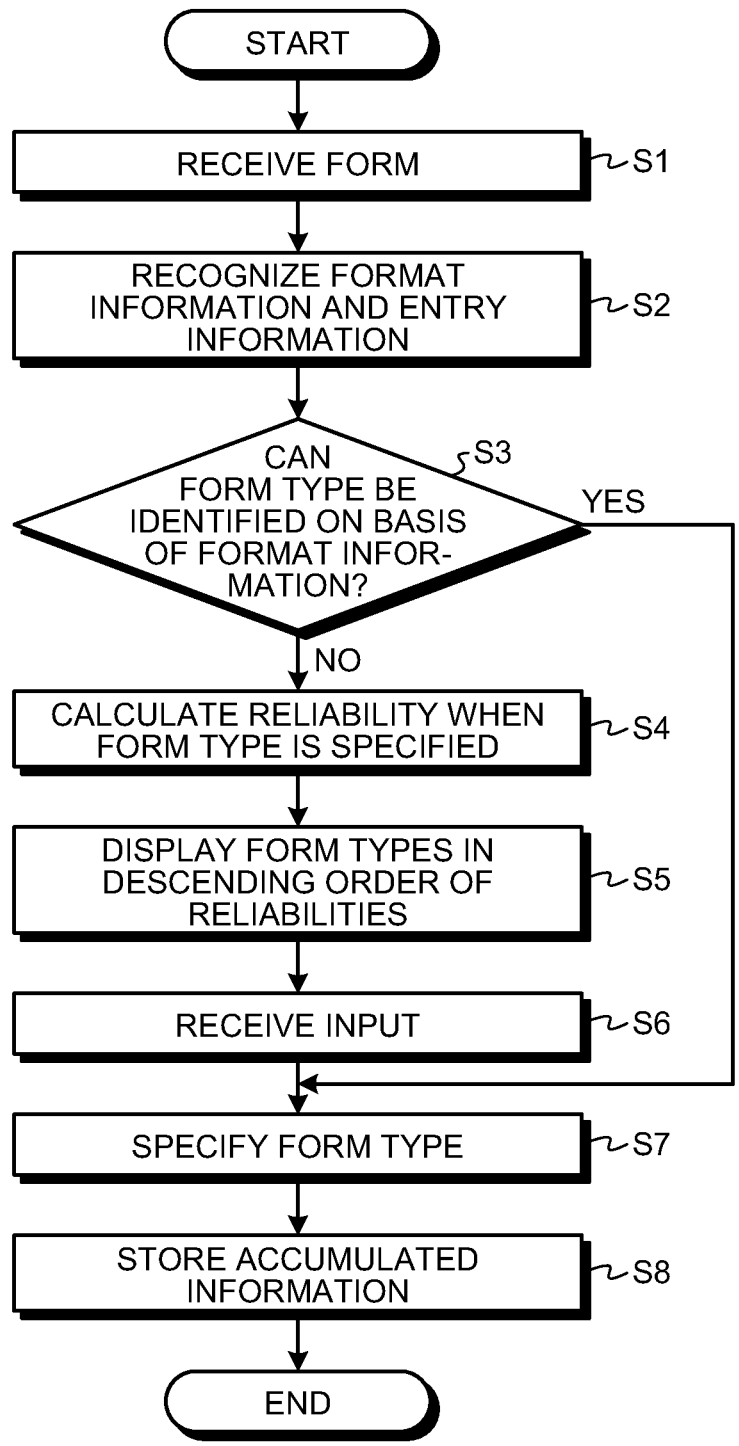
FIG. 5 is a flowchart illustrating an example of an information processing method according to the embodiment.

FIG. 5 is a flowchart illustrating an example of an information processing method according to the embodiment. First, the reception unit 2 receives a form (step S1). Subsequently, the recognition unit 3 recognizes format information of the form and entry information contained in the form (step S2). The recognition unit 3 inputs the format information to the identification unit 4, and inputs the entry information to the specification unit 5. Subsequently, the identification unit 4 determines whether or not the type of the form can be identified on the basis of the format information of the form (step S3).

If the form type can be identified (step S3, Yes), the process proceeds to step S7.

If the form type cannot be identified (step S3, No), the specification unit 5 calculates reliability P when the form type is specified (step S4). Specifically, the specification unit 5 receives entry information from the recognition unit 3 and receives information indicating multiple form types from the identification unit 4. The specification unit 5 then calculates the reliabilities P of the form types on the basis of the content of entry of the entry information and the predetermined expression described above.

Subsequently, the display control unit 6 displays the form types in descending order of the reliabilities P, and displays a selection screen for receiving selection of a form from the user on the display unit 7 (step S5). Subsequently, the input unit 8 receives an input indicating selection of a form type (step S6). Since the form types are displayed in descending order of the reliabilities P on the display unit 7, it is possible to save the user's trouble for selecting a correct form type even when many form types are displayed.

Subsequently, the specification unit 5 specifies a form type (step S7). Specifically, if the form type can be identified (step S3, Yes), the identification unit 4 inputs information indicating one form type to the specification unit 5, and the specification unit 5 specifies a form type. If the form type cannot be identified (step S3, No), the specification unit 5 specifies a form type on the basis of an input indicating selection of a form type received by the input unit 8 in step S6.

Subsequently, the specification unit 5 stores entry information for each entry field of the accumulated information 13 of the form specified in step S7 (step S8).

Figure 6:
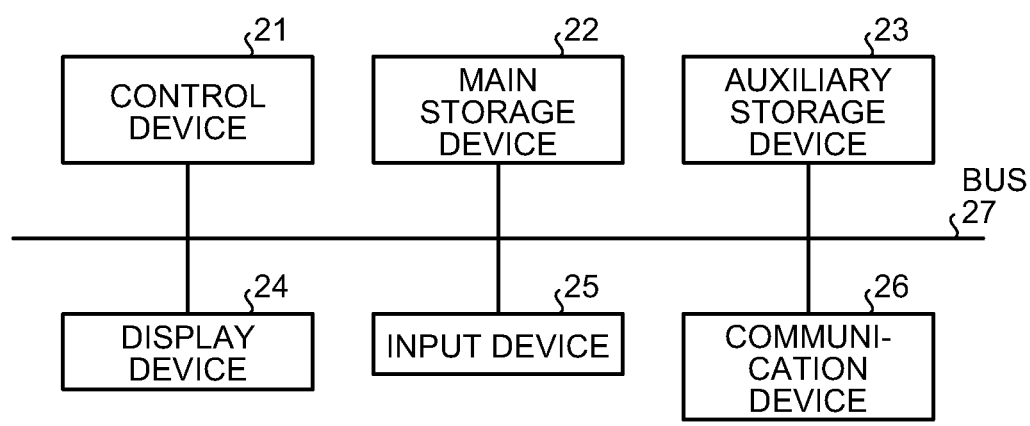
FIG. 6 is a diagram illustrating an example of a hardware configuration of an information processing device according to the embodiment.

Finally, an example of a hardware configuration of the information processing device 100 according to the embodiment will be described. FIG. 6 is a diagram illustrating an example of a hardware configuration of the information processing device 100 according to the embodiment.

The information processing device 100 of the embodiment includes a control unit 21, a main storage unit 22, an auxiliary storage unit 23, a display unit 24, an input unit 25, and a communication unit 26. The control unit 21, the main storage unit 22, the auxiliary storage unit 23, the display unit 24, the input unit 25, and the communication unit 26 are connected via a bus 27. The information processing device 100 is a personal computer, a smart device, or the like, for example.

The control unit 21 executes a program read from the auxiliary storage unit 23 into the main storage unit 22. The main storage unit 22 is a memory such as a read only memory (ROM) or a random access memory (RAM). The auxiliary storage unit 23 is a hard disk drive (HDD), an optical drive, or the like. The storage unit 1 in FIG. 1 corresponds to the main storage unit 22 and the auxiliary storage unit 23.

The display unit 24 displays a state or the like of the information processing device 100. The display unit 24 is a liquid crystal display, for example. The input unit 25 is an interface for manipulation of the information processing device 100. The input unit 25 is a keyboard, a mouse, or the like, for example. When the information processing device 100 is a smart device such as a smart phone or a tablet terminal, the display unit 24 and the input unit 25 may be a touch panel. The communication unit 26 is an interface for connection to a network.

Programs to be executed by the information processing device 100 according to the embodiment are recorded on a computer readable recording medium such as a CD-ROM, a memory card, a CD-R, or a digital versatile disk (DVD) in a form of a file that can be installed or executed, and provided as a computer program product.

Alternatively, the programs to be executed by the information processing device 100 according to the embodiment may be stored on a computer system connected to a network such as the Internet, and provided by being downloaded via the network. Alternatively, the programs to be executed by the information processing device 100 according to the embodiment maybe provided via a network such as the Internet without being downloaded.

Still alternatively, the programs for the information processing device 100 according to the embodiment may be embedded in a ROM or the like in advance and provided therefrom.

The programs to be executed by the information processing device 100 according to the embodiment have modular structure including the functional blocks (the reception unit 2, the recognition unit 3, the identification unit 4, the specification unit 5, and the display control unit 6) in FIG. 1 described above. In an actual hardware configuration, the control unit 21 reads programs from the storage medium and executes the programs, whereby the functional block loaded on the main storage unit 22. In other words, the functional blocks are generated on the main storage unit 22. Note that some or all the functional blocks in FIG. 1 described above may be achieved by hardware such as integrated circuits (ICs) and the like instead of being implemented in software.

As described above, in the information processing device 100 according to the embodiment, the storage unit 1 stores accumulated information 13 containing entry information of multiple types of forms accumulated by form type and entry field. The specification unit 5 then compares the accumulated information 13 and the entry information recognized by the recognition unit 3 to specify the type of the form received by the reception unit 2. As a result, one form type can be specified from multiple form types even when the form type cannot be identified on the basis of the format information.

For example, according to the information processing device 100 of the embodiment, when the identification unit 4 cannot identify the form type in a case where the recognition unit 3 misreads character recognition of a preprinted character string (explanation of entry fields, etc.), in a case where a character string is missing for some reasons, or in like cases, one form type can be specified from multiple form types.

Furthermore, for example, in a case where the reception unit 2 is a camera built in a smart phone, a tablet, or the like instead of a scanner, the form may not be entirely photographed. Even when the identification unit 4 cannot identify the form type because the form is not photographed entirely, one form type can be specified from the multiple form types according to the information processing device 100 of the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory configured to store therein accumulated information containing entry information and category information accumulated by form type and entry field, the entry information being based on information that is written, when a form is written, to the entry field of the form by a user, the category information representing a category of the entry information, the category information being stored in association with the entry information; and
one or more processors configured to:
receive a form;
recognize entry information entered in the form received;
calculate a reliability of the form type based on whether or not the entry information recognized is contained in the accumulated information, a proportion of the entry information recognized that is contained in the accumulated information, and a proportion of entry information in a same category as the entry information recognized that is contained in the accumulated information; and
specifying multiple form types in a descending order of the reliabilities.

2. The device according to claim 1, wherein the one or more processors are further configured to display the multiple form types in the descending order of the reliabilities, and display a selection screen for receiving a selection of the form type from a user, and
the specifying specifies the type of the form on the basis of the selection of the form type by the user.

3. The device according to claim 1, wherein the one or more processors are further configured to identify a type of the form,
the memory further stores therein a form model representing a format of each form type,
the one or more processors are further configured to recognize format information representing a format of the form received,
the identifying compares the format information with the form model to identify the type of the received form, and
when the identifying of the type of the form fails, the specifying specifies the multiple form types in the descending order of the reliabilities.

4. An information processing method for an information processing device including a memory configured to store therein accumulated information containing entry information and category information accumulated by form type and entry field, the entry information being based on information that is written, when a form is written, to the entry field of the form by a user, the category information representing a category of the entry information, the category information being stored in association with the entry information, the method comprising:

receiving a form by the information processing device;

recognizing entry information entered in the form received in the receiving by the information processing device;

calculating a reliability of the form type based on whether or not the entry information recognized is contained in the accumulated information, a proportion of the entry information recognized that is contained in the accumulated information, and a proportion of the entry information in a same category as the entry information recognized that is contained in the accumulated information; and specifying multiple form types in a descending order of the reliabilities.

5. A computer program product comprising a non-transitory computer readable medium including programmed instructions, wherein the instructions, when executed by a computer configured to store accumulated information containing entry information and category information accumulated by form type and entry field, the entry information being based on information that is written, when a form is written, to the entry field of the form by a user, the category information representing a category of the entry information, the category information being stored in association with the entry information, cause the computer to perform:

receiving a form;

recognizing entry information entered in the received form;

calculating a reliability of the form type based on whether or not the entry information recognized is contained in the accumulated information, a proportion of the entry information recognized that is contained in the accumulated information, and a proportion of the entry information in a same category as the entry information recognized that is contained in the accumulated information; and specifying multiple form types in a descending order of the reliabilities.

\* \* \* \* \*